Oct. 20, 1931.  C. F. M. VAN BERKEL  1,827,917
WEIGHING MECHANISM FOR SLICING MACHINES
Filed Jan. 18, 1928
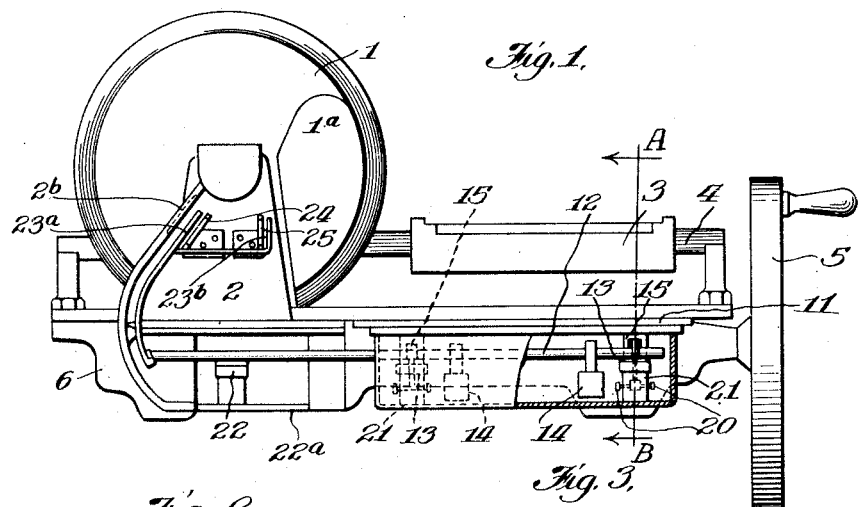
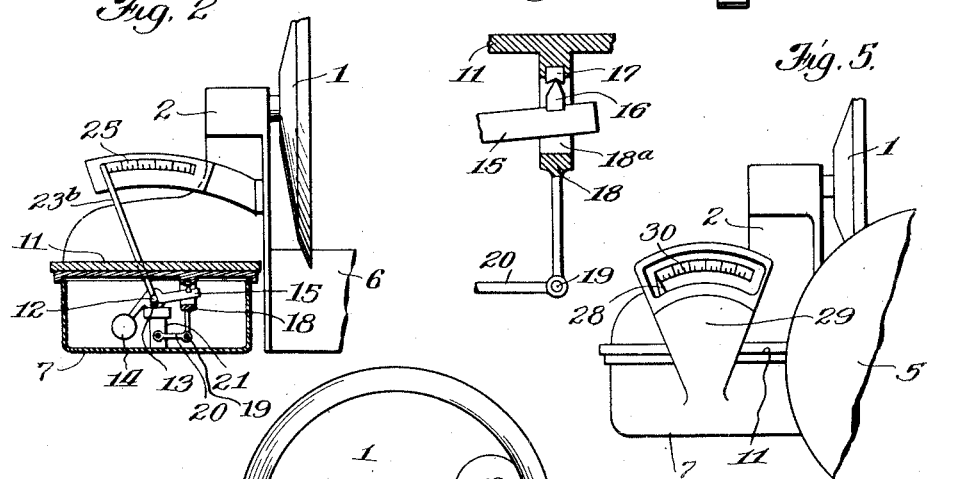
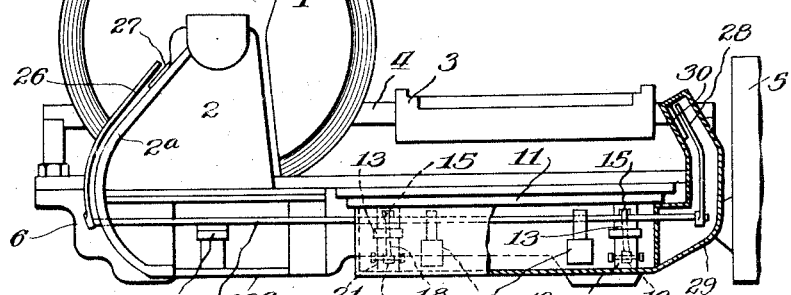
Inventor
Cornelis F. M. van Berkel Patented Oct. 20, 1931

1,827,917

UNITED STATES PATENT OFFICE

CORNELIS F. M. VAN BERKEL, OF WASSENAAR, NETHERLANDS, ASSIGNOR TO U. S. SLICING MACHINE COMPANY, OF LA PORTE, INDIANA, A CORPORATION OF INDIANA

WEIGHING MECHANISM FOR SLICING MACHINES

Application filed January 18, 1928, Serial No. 247,509, and in Great Britain February 9, 1927.

This invention relates to slicing machines and has particular reference to machines of this type having an automatic weighing device associated therewith.

The object of the present invention is to provide improved indicating mechanism for such weighing devices.

To the attainment of this object I provide a slicing machine with a weighing device having indicating mechanism comprising a pair of indicators so arranged relatively to the slicing machine as to be clearly visible to the salesman and buyer, respectively, besides being non-obstructive to the slicing and weighing operations, and means, comprising an extension of the weighing mechanism, whereby said mechanism is connected with the said indicators. The indicator for the buyer, or the indicators for both the buyer and salesman, may be associated with a support for the slicing member; and, in the latter case, the two indicators are preferably made integral so as to form a single bifurcated pointer with which graduated scales are associated.

In order that my invention may be clearly understood, two embodiments thereof, as applied to a slicing machine having a rotary knife, will now be described by way of example and with reference to the annexed drawings, in which—

Fig. 1 is a side view of the slicing machine showing the weighing device, partly in section, and one form of indicating mechanism;

Fig. 2 is a sectional view on the line A—B (Fig. 1) with the reciprocating carriage removed and the base of the machine broken away;

Fig. 3 is an enlarged view of a detail of the weighing mechanism;

Fig. 4 is a side view, partly in section, of another embodiment of my invention; and Fig. 5 is an end view of the embodiment shown in Fig. 4.

Referring to the drawings, the slicing machine comprises a rotary knife 1 supported by a bracket 2 and a reciprocating carriage 3 mounted upon guides 4, the whole being operated by a hand wheel 5. The bracket 2 and guides 4 are carried upon the base 6 of the machine, which base also carries the weighing device, contained within the casing 7. Above the casing 7 is a weighing platform 11, onto which the slices when cut are guided by a guide plate 1ª carried by a bracket 2.

The weighing mechanism proper comprises an oscillating shaft 12 mounted on knife edge bearings 13 and fitted with pendulous resistants 14. The shaft 12 is also provided with levers 15 which in turn carry knife edges 16 (see Fig. 3) on which rest agate-stones 17. The said agate-stones 17 are mounted in projections 18 formed upon or secured rigidly to the under surface of the platform 11. An aperture 18ª is provided in each of the projections 18 through which aperture, the lever 15 passes (see Fig. 3). At the bottom ends of each projection 18 a pivotal joint 19 connects said projection to a check link mechanism 20 mounted on the pedestal 21 of the respective knife edge bearing 13.

The oscillating shaft 12 is extended toward the front of the machine in the constructions shown, the extended portion being supported in each case by a knife-edge bearing 22 mounted on a frame 22ª carried by the slicing machine 6.

In the construction shown in Fig. 1, the end of the forwardly extended portion of the shaft 12 carries a bifurcated pointer, the arm 23ª of which is arranged in front of a scale 24, clearly visible to the buyer, whilst the arm 23ᵇ co-operates with another scale 25, clearly visible to the salesman. Both scales 24 and 25 are mounted on the bracket 2, and, to secure rigidity, may be braced together. In cases where the web 2ª of the bracket 2 tends to obscure the buyer's view of the pointer arm 23ª and scale 24, the said web can be slotted, and be provided with a window 2ᵇ.

In Fig. 4 a different arrangement of indicators is shown, the oscillating shaft 12 being extended in both directions beyond the casing 7.

For the use of the buyer, the appropriate end of the shaft 12 is provided with a pointer 26, which latter is shaped so as to conform to the disposition of a scale 27 mounted on the web 2ª of the bracket 2. The indicator for the seller comprises a pointer 28 at the other end of the shaft 12, this pointer being enclosed by a housing 29 containing a graduated scale 30.

It will be understood that besides being applicable to a slicing machine having a rotary knife, my invention may be applied to slicing machines comprising a swinging arm and also to other known types.

Having now particularly described and ascertained the nature of my said invention and in what manner the same is to be performed, I declare that what I claim is:

1. In a slicing machine having a frame, a slice receiver, weighing mechanism for weighing slices deposited on said receiver, and a duplex indicator for said weighing mechanism for indicating the weight of said slices both to the operator and the customer adapted to co-operate with stationary means on said slicing machine frame.

2. A slicing machine having a frame, a weighing device, and indicating mechanism for said weighing device comprising a pair of indicators so arranged relative to the slicing machine as to be clearly visible from opposite sides of said slicing machine and disposed in a position not to obstruct the slicing and weighing operations adapted to co-operate with stationary means on said slicing machine frame.

3. The combination with a slicing machine having a frame, a slice receiving platform, of weighing mechanism for indicating the weight of material deposited upon said platform, an extension connected with said indicating mechanism, and a double indicator connected with said extension for indicating the weight of the slices in position to be visible from both the front and rear of said slicing machine adapted to co-operate with stationary means on said slicing machine frame.

4. The combination with a slicing machine having a slice receiving platform, of weighing mechanism for weighing slices deposited on said platform, said slicing machine having a slicing knife and a bracket for supporting said knife, an extension connected with said weighing mechanism, and an indicator carried by said extension and disposed adjacent said slicing knife bracket.

5. A slicing machine having a slicing knife, a bracket for supporting said slicing knife and a slice receiving platform, weighing mechanism for weighing slices deposited on said platform, an extension connected with said weighing mechanism, a bifurcated indicator carried by said extension, and a pair of co-operating indicating means on said bracket facing one to the front and one to the rear of said slicing machine and arranged to co-operate with the bifurcations of said indicator for indicating weight both to the operator and customer.

6. The combination with a slicing machine, of a weighing device for receiving slices from said slicing machine, said weighing device having a rod mounted to oscillate about an axis, said rod being extended toward the front of said slicing machine, and indicating mechanism carried by said rod in position to indicate to the customer the weight of material on said weighing device.

7. The combination with a slicing machine, of a slice receiving platform, weighing mechanism for supporting said platform, means for directing slices from said slicing machine to said platform, said weighing mechanism comprising a rod pivoted to rotate about an axis, said rod being extended to the front and rear of said slicing machine, and indicators connected with the opposite ends of said rod.

8. A weighing device for use in connection with slicing machines, comprising a supporting frame, a weighing platform, a casing for the weighing mechanism, an oscillating shaft mounted on knife edge bearings within said casing, means for operatively connecting said oscillating shaft with the weighing platform, pendulous means for resisting oscillation of said shaft acting in opposition to the weight on said platform, parallel guiding means for said platform and co-operating indicating means on said slicing machine frame and rod.

9. Weighing mechanism for use in connection with slicing machines, comprising a weighing platform, an outer casing, an oscillating shaft mounted on knife edge bearings within said casing, means for operatively connecting the oscillating shaft with the weighing platform, pendulous means for resisting oscillation of said shaft arranged to act in opposition to the weight on said platform, and parallel guiding means for said platform, said oscillating shaft being extended beyond said casing and having a pointer carried on the extended portion thereof and arranged to co-operate with a graduated scale mounted on the slicing machine.

10. Weighing mechanism for slicing machines, comprising a platform arranged to receive slices from said slicing machine, an oscillating shaft operated by said weighing mechanism, a graduated scale mounted at one side of said slicing machine, a pointer connected with said shaft arranged to co-operate with said scale, a housing mounted at the opposite side of said slicing machine, a pointer connected with said shaft arranged to oscillate within said housing, and a graduated scale on said housing co-operating with said last-named pointer.

11. The combination with a slicing machine having a slice receiving platform, of weighing mechanism for weighing slices deposited on said platform, said slicing machine having a slicing knife and a bracket for supporting said knife, an extension operatively connected to and actuated by said weighing mechanism, a plurality of indicators carried by said extension and disposed adjacent said slicing knife bracket, and means on said bracket to indicate a function of the article being weighed, said indicators co-operating with said last mentioned means for indicating the weight of the slices on said platform.

12. Weighing mechanism for slicing machines comprising a platform arranged to receive slices after they have been cut by the slicing machine knife, an oscillating shaft, means for operating said shaft by the load platform of said weighing mechanism, a graduated scale adapted to be mounted on one side of said slicing machine, an indicating means on said shaft at one end thereof and co-operating with said scale, a second indicating means mounted on said shaft at the opposite end thereof, and a scale mounted on said weighing mechanism co-operating with said last named indicating means.

13. The combination with a slicing machine, of a slice receiving platform, weighing mechanism for supporting said platform, said weighing mechanism comprising a rod pivoted to oscillate about an axis, said rod being extended to the front and rear of said slicing machine, and indicators connected with the opposite ends of said rod co-operating with scales on a stationary part of the slicing machine.

14. A slicing machine comprising a frame, a knife supported on said frame, a weighing platform adapted to receive the slices as they are cut by the knife, and co-operating means operatively connected to said frame and said weighing platform for indicating the weight of the slices deposited thereon.

In testimony whereof I have signed my name to this specification on this 21st day of December A. D. 1927.

CORNELIS F. M. van BERKEL.